Dec. 10, 1968   W. W. ROYER ET AL   3,415,135
OBLIQUE LAY POCKET WHEEL
Filed Dec. 6, 1965                         2 Sheets-Sheet 2
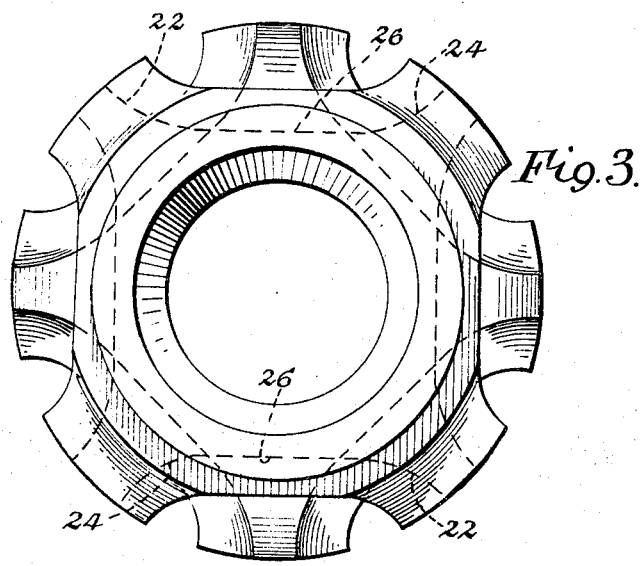
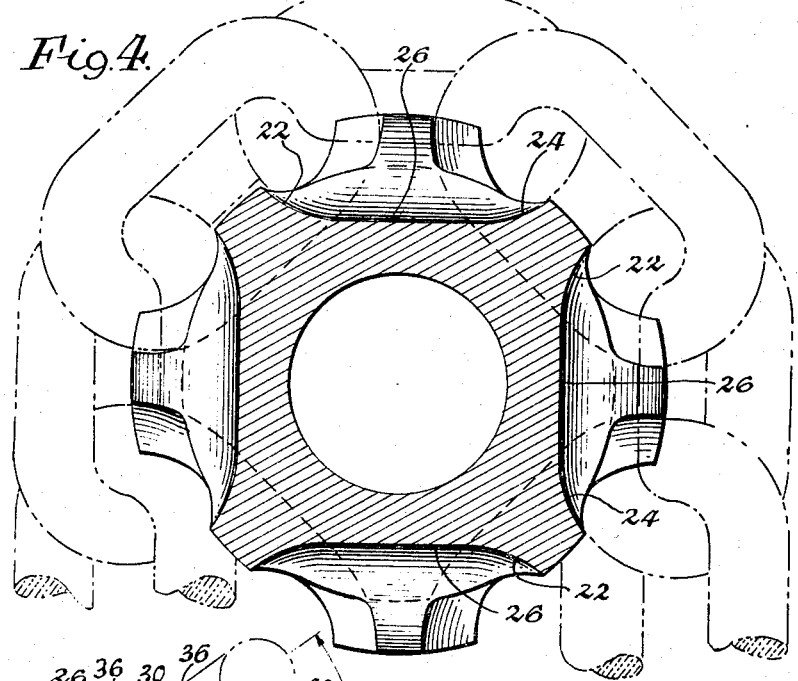
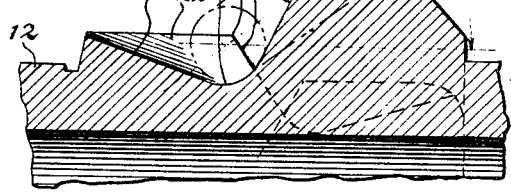
INVENTORS
WILLIAM M. ROYER
DENNIS MOLNAR
RUSSELL F. KAYE
RAYMOND M. ROBINSON
Bean, Brooks, Buckley & Bean
ATTORNEYS

United States Patent Office 3,415,135
Patented Dec. 10, 1968

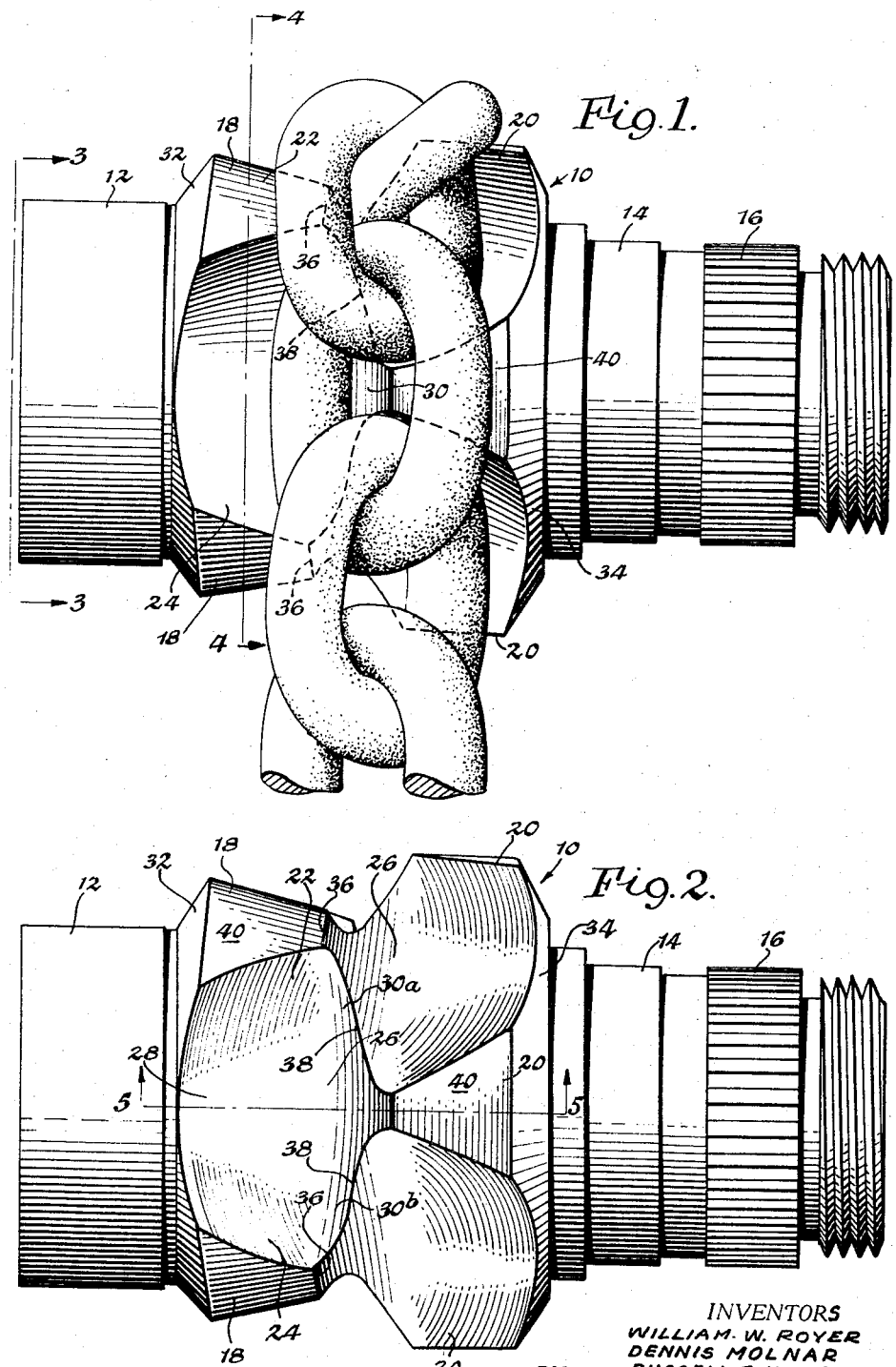

3,415,135
OBLIQUE LAY POCKET WHEEL
William W. Royer, Charlotte, N.C., and Dennis Molnar and Russell F. Kaye, Kenmore, and Raymond M. Robinson, Clarence, N.Y., assignors to Columbus McKinnon Corporation, Tonawanda, N.Y.
Filed Dec. 6, 1965, Ser. No. 511,613
2 Claims. (Cl. 74—229)

ABSTRACT OF THE DISCLOSURE

A pocket wheel for driving chains is provided with teeth having inclining side surfaces materially less than 45° in inclination to the axis of rotation so that chain links lying within the pockets assume an angle materially less than 45° with respect to the axis of rotation. In this way, periodic overloading of the chain is materially reduced to effectively increase the life of the chain.

---

This invention relates to an improved form of drive sprocket for oval link chain and is directed primarily to a drive sprocket construction adapted to increase the longevity of the chain with which it is associated.

Drive sprockets for chains are provided with a series of circumferentially arranged pockets for receiving successive links of the chain in which the successive links lie, when viewed along the chain center line, in planes disposed at right angles to each other. In such constructions, successive links lie in upstanding and flat relation (i.e., in planes perpendicular and parallel, respectively, to the axis of the sprocket). As the chain is driven by the sprocket, articulation between successive links occurs due to the fact that the chain is changing in its path of direction as it passes over the sprocket. This articulation, with conventional sprockets, gives rise to periodic or cyclic loading of the chain which is of such magnitude as to materially shorten the life of the load chain by causing premature failure due to fatigue. The effect, in turn, is greatly aggravated when the diameter of the sprocket is relatively small, as is usually the case. That is to say, the fatigue failure effect is most pronounced when the sprocket, because of space restrictions, is required to have but a few pockets in its circumference (i.e., is of small diameter).

We have found that if the sprocket is so constructed as to cause successive links to lie at angles, relative to the axis of the sprocket, which are less than 45°, the chain will less quickly fatigue and fail under load, even with sprockets of very small diameter.

It is, therefore, of primary concern in connection with this inventtion to provide an improved form of chain sprocket which is provided with two series of radial projections or teeth with intervening troughs or pockets which constrain the links of a chain to orient themselves as aforesaid in passing around the sprocket.

Further, it is an object of this invention to provide an optimum relation between the angle of repose of the links, as they are carried around by the sprocket, and certain dimensional characteristics of the chain links and sprocket, to the end that chain life is materially increased.

Other objects and advantages of the invention will appear from the specification hereinafter and the accompanying drawing, wherein:

FIG. 1 is an elevational view illustrating a sprocket according to this invention and a conventional chain associated therewith;

FIG. 2 is a view similar to FIGURE 1 but with the chain removed;

FIG. 3 is an end view of the sprocket as indicated by section line 3—3 in FIGURE 1;

FIG. 4 is a cross section taken along section line 4—4 in FIGURE 1; and

FIG. 5 is a partial section taken along section line 5—5 in FIGURE 2.

Referring first to FIGURE 2, the sprocket shown therein is integrally formed with its shaft. Thus, the sprocket body, indicated generally by reference character 10, is integral with the shaft journal portions 12 and 14 by means of which the assembly is adapted for rotation about a fixed axis. A further shaft portion is provided with splines as indicated by reference character 16 for reception of a suitable gear so that drive may be imparted to the shaft and its integral sprocket.

The body 10 is provided with two series of teeth, one such series being composed of teeth 18 and the other series being composed of teeth 20. The teeth of each series are evenly circumferentially spaced with the teeth of one series being positioned, circumferentially, midway between adjacent teeth of the other series. Each tooth is provided with concave flank surfaces so that each serial pair of teeth present the mutually opposed concave flank surfaces 22 and 24 which are adapted to receive and engage the curved opposite ends of a chain link therebetween while the valleys 26 between such flank surfaces are flat (see FIGURES 3 and 4) to permit the barrel of an associated link to lie therein. The valleys 26 are defined by the downwardly sloping surfaces 28 and 30 (see FIGURE 5) and are radiused according to the diameter of chain link barrel to be accommodated thereby.

The surfaces 28 are ground or otherwise suitably formed downwardly and inwardly from the heel faces 32 or 34 of the series of teeth 18 or 20 respectively while the surfaces 30 are the toe surfaces of the respective teeth and lateral extensions thereof extending to the toe edges 36 of the two adjacent teeth of the other series. That is to say, considering FIGURE 2, the surface 30 therein indicated is the toe face of the central tooth 20 and the lateral wings or extensions 30a and 30b extend respectively to the upper and lower teeth 18 shown. As shown, the toe edges 36 of all tooth series are axially spaced from the toe edges of the other series so that the various toe faces 30 intersect to form diagonal ridges 38.

Each tooth includes an outer face 40 which may simply be a portion of a cylindrical surface as shown. The height of these outer faces 40 above the corresponding valleys must be low enough to prevent interference with the angle at which the chain links lie naturally within the valleys. It has been found that if this angle is somewhat less than 45° with respect to the axis of rotation and preferably in the order of 36° for sprockets having only a few (i.e., 8) pockets, the chain is less subject to fatigue failure. Moreover, the improvement in this respect is in the order of 1½ to 2. That is, the chain can be expected to last 1½ to 2 times longer with the sprocket of the present invention as compared with conventional sprockets in which the chain links are crossed at 90°. It will be noted that the valley 26 for any chain link is formed between adjacent teeth of one series while the outer chain barrel of this link is disposed above and clear of the outer face of the intermediate tooth of the other series.

The angle α (FIGURE 5) at which a chain link lies within its associated valley will be in the order of 36° for sprockets having a small number of pockets. Optionally, and as a general statement covering drive sprockets having a large number of pockets (and consequent large diameters) the angle should satisfy the following:

$$\alpha = \pi/4 - \tan^{-1}\left[\frac{d}{p}\sin\frac{2P}{D}\right]$$

where:

α = Slope angles in radians.
d = Chain stock diameter.
P = Chain link inside length.
D = Geometric pitch diameter of sprocket.

Another important feature of this invention is that the distance between the sprocket axis and a surface which clears the chain as it is trained over the sprocket is very much less with sprockets constructed according to this invention as compared with conventional sprockets having the same number of pockets. This is a desirable feature by virtue of the fact that the drive sprocket of an electric hoist should require a minimum radial spacing, in order to assume a compact and efficient assembly. Drive sprockets herein inherently meet this requirement. Further, it is possible in some applications to provide a greater number of pockets than would be possible with a conventional sprocket, given the same amount of clearance space; a greater number of pockets being a desirable attribute under any circumstances.

Whereas only one form of this invention has been illustrated and described in detail hereinabove, it will be understood that various changes may be made therein without departing from the spirit of this invention or the scope of the following claims.

What is claimed is:

1. A drive sprocket for chains comprising a body adapted for rotation about a fixed axis,
    said body having a first series of pockets therein extending circumferentially therearound with the pockets being evenly spaced from each other, said body also having a second series of pockets therein extending circumferentially therearound with the pockets of the second series being evenly spaced from each other, the pockets of the two series being axially spaced and symmetrically staggered circumferentially, and said pockets having inclined support surfaces disposed at angles in the order of 36° with respect to said axis of rotation.

2. A drive sprocket for chains comprising a body adapted for rotation about a fixed axis,
    said body having a first series of pockets therein extending circumferentially therearound with the pockets being evenly spaced from each other, said body also having a second series of pockets therein extending circumferentially therearound with the pockets of the second series being evenly spaced from each other, the pockets of the two series being axially spaced and symmetrically staggered circumferentially, and said pockets having inclined support surfaces disposed at angles to cause associated chain links to lie therein at an angle of less than 45° with respect to said axis of rotation in combination with a chain formed of links from stock of diameter $d$ and inside length $P$, the inclination of said support surfaces being $\alpha$, with:

$$\alpha = \pi/4 - \tan^{-1}\left[\frac{d}{P}\sin\frac{2P}{D}\right]$$

where $\alpha$ is in radians; $d$ is the chain stock diameter; $P$ is the inside length of a chain link; and $D$ is the geometrical pitch diameter of the sprocket.

References Cited

UNITED STATES PATENTS

| | | | |
|---|---|---|---|
| 325,539 | 9/1885 | Herman | 74—243 |
| 662,768 | 11/1900 | Crowe | 74—243 |

FRED C. MATTERN, JR., *Primary Examiner.*

J. A. WONG, *Assistant Examiner.*

U.S. Cl. X.R.

74—243